Dec. 25, 1962

M. J. BRIAN 3,070,121

BACKWATER VALVE

Filed Aug. 30, 1961

INVENTOR
Malcolm J. Brian.
BY Alex. E. MacRae
ATTORNEY

United States Patent Office 3,070,121
Patented Dec. 25, 1962

3,070,121
BACKWATER VALVE
Malcolm J. Brian, 276 Pitt St., Windsor, Ontario, Canada
Filed Aug. 30, 1961, Ser. No. 137,709
1 Claim. (Cl. 137—523)

This invention relates to backwater valves. This application is a continuation-in-part of application, Serial No. 9,862, filed February 19, 1960.

It is frequent practice to provide a backwater valve in a drain pipe or the like to prevent reverse flow in the pipe such as may occur when the waste water in the drainage system backs up due to various causes such as the presence of flooding conditions in the system. However, in many cases, the valve remains in partially open position due, for instance, to fouling of the valve parts by obstructions of foreign matter, corrosion, or insufficient back pressure to seat the valve. In such cases, the function of the valve is partially or wholly nullified.

It is an object of this invention to provide a backwater valve of simple construction in which the operator may readily determine the position of the valve, in which the opening and closing movements of the valve may be conveniently and quickly tested whereby its proper operation may be inspected and, if necessary, corrected, and which may be effectively locked in either open or closed position as desired.

Figure 1:
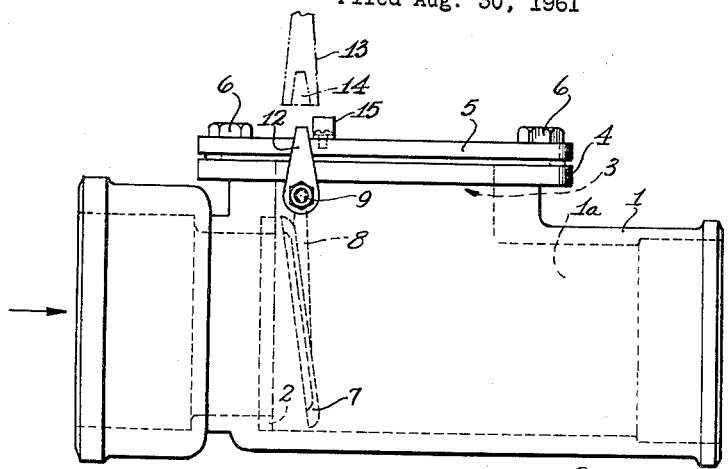
Figure 2:
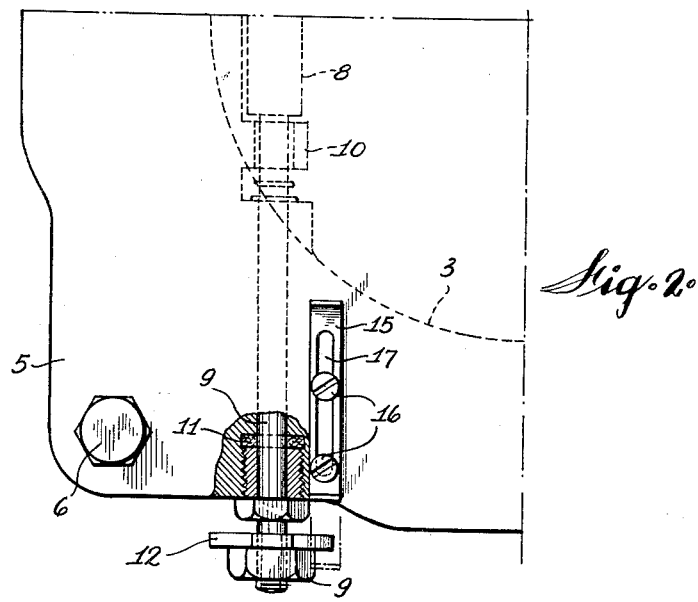

The invention will be described with reference to the accompanying drawing, in which FIGURE 1 is a side elevation of a backwater valve in accordance with the invention, and FIGURE 2 is a plan view of the valve.

In the drawing, 1 is a tubular member having a passage 1a therein and which is adapted to be inserted in a drainage pipe or the like and in which the drainage flow is normally in the direction of the arrow.

The passage 1a is provided with an annular valve seat 2 intermediate the inlet and outlet ends thereof. The member 1 has a circular opening 3 in the top portion thereof provided with an annular flange 4 for reception of a closure plate 5 which may be bolted thereon by bolts 6.

A valve disc or flap 7 is swingably mounted in the member 1 for closing engagement with the seat 2 and for opening movement with respect thereto. The mounting means shown comprises an arm 8 fixed to the disc 7 and to a hinge pin 9 rotatably mounted in bearing lugs 10. One end of pin 9 projects laterally outwardly of the member 1 through a suitable gas and water seal 11.

Fixed to the projecting portion of pin 9 is an indicator arm 12. It will be apparent that, by observing the angular position of the arm 12, the corresponding position of the flap 7 may be readily determined.

Moreover, the arm 12 may be utilized to swing the flap 7 manually throughout its range of operating movement. For convenience, it is proposed to provide an actuating handle 13 for this purpose, such handle constituting an extension of the arm 12 and having a socket 14 complementarily shaped for reception of the end portion of arm 12.

Means are also preferably provided for locking the flap 7 in either open or closed position. Such means may conveniently comprise a locking strip 15 slidably mounted on closure plate 5 as by means of pins 16 which extend through a slot 17 in the strip 15. As shown, the strip 15 is arranged in proximity to the arm 12 and parallel to the hinge pin 9. With particular reference to FIGURE 1, it will be observed, that in the upright position of arm 12, the flap 7 is in partially open position. Now, if the locking strip 15 is reciprocated outwardly to the dotted line position of FIGURE 2, the flap 7 will be prevented from closing movement from such partially open position by engagement of the locking strip with one side of the arm 12. However (with the locking strip withdrawn) the flap 7 may be moved to closed position by swinging the arm 12 in a clockwise direction (as viewed in FIGURE 1). In such position, the locking strip 15 may be reciprocated outwardly whereby the other side of arm 12 will engage the strip which therefore locks the flap in closed position.

There has thus been provided a backwater valve the position of which may be instantly determined by visual inspection of the indicator arm 12. Moreover, by actuation of the arm 12, the operator can test the operation of the valve throughout its entire range of movement. Furthermore, the valve may be locked in various positions to meet varying conditions of use or employed in unlocked condition for fully automatic operation.

I claim:

A backwater valve comprising a tubular member having a passage, a valve seat in said passage, an opening in the side wall of said tubular member communicating with said passage, the axis of said opening being disposed normal to the axis of said passage, a closure plate for said opening, said closure plate extending horizontally when said valve is in operative position, a hinge pin rotatably mounted in said member in parallel relation to said closure plate, a flap carried by said hinge pin and swingable to a closed position with respect to said seat to close said passage and to an open position with respect to said seat to open said passage, said hinge pin having an end portion extending outwardly of said tubular member, an indicator arm fixed to said end portion of said hinge pin, said indicator arm having an end portion extending upwardly above the plane of the outer surface of said closure plate in both said closed and open positions, said end portion of said arm having a pair of opposed converging side edges, and a locking strip slidably mounted to move horizontally on the upper surface of said closure plate, said locking strip being slidable parallel said upper surface into a locking position wherein said strip projects outwardly beyond an edge of said closure plate and a released position wherein said strip is confined within the edges of said closure plate, said strip in said locking position having engagement with a selected one of said pair of opposed side edges of said indicator arm to restrain swinging movement of said indicator arm and flap, said strip in said released position being free of engagement with said indicator arm to permit swinging movement thereof and of said flap, engagement of said strip with one of said opposed edges of said indicator arm defining said open position of said flap and engagement of said strip with the other of said opposed edges of said indicator arm defining said closed position of said flap, an operating handle extending upwardly from said indicator arm, said handle having a recess in its lower end, said recess being inwardly tapered so as to slidably receive said indicator arm, the outer end of said recess being substantially larger than the upper end of said arm.

References Cited in the file of this patent
UNITED STATES PATENTS

| | | |
|---|---|---|
| 1,391,309 | Forcier | Sept. 20, 1921 |
| 1,839,053 | Schaded | Dec. 29, 1931 |
| 1,856,138 | Ruemelin | May 3, 1932 |
| 2,059,733 | Heisser | Nov. 3, 1936 |
| 2,699,318 | Ellison | Jan. 11, 1955 |
| 2,852,037 | Downing | Sept. 13, 1958 |